United States Patent [19]

Pridy

[11] 4,437,218
[45] Mar. 20, 1984

[54] PORTABLE OIL WELL TURBINE COLLAR REMOVING DEVICE

[76] Inventor: Whetstine B. Pridy, 2762 Blume, Los Alamitos, Calif. 90720

[21] Appl. No.: 372,211

[22] Filed: Apr. 26, 1982

[51] Int. Cl.³ .............................................. B23P 19/04
[52] U.S. Cl. ...................................... 29/240; 81/57.34; 81/57.35
[58] Field of Search .............. 29/240; 81/57.16, 57.22, 81/57.34, 57.35, 57.36

[56] References Cited

U.S. PATENT DOCUMENTS

| | | | |
|---|---|---|---|
| 3,518,903 | 7/1970 | Ham et al. | 81/57.16 |
| 3,545,313 | 12/1970 | Kelly | 81/57.34 |
| 3,838,613 | 10/1974 | Wilms | 81/57.16 X |
| 3,900,938 | 8/1975 | Blomgren, Sr. et al. | 29/240 |
| 3,916,500 | 11/1975 | Brown | 29/240 |

Primary Examiner—Frederick R. Schmidt
Assistant Examiner—Steven P. Schad
Attorney, Agent, or Firm—William C. Babcock

[57] ABSTRACT

A portable power operated apparatus that may be positioned adjacent a first stack of lengths of oil well tubing having collars screwed on first ends thereof. The lengths of tubing are subsequently removed from the first stack onto the apparatus. Each length of tubing after being disposed on the apparatus is power rotated with the collar being removably held stationary relative to the tubing to separate the collar therefrom. The collar after removal is inspected, and if found satisfactory for further use is directed to the rearward end of the apparatus. The collar at the rearward end of the apparatus is removably gripped in a reverse position and screwed onto the second end of the tubing by rotating the latter. The length of tubing with collar attached is then lifted by the apparatus and moved to a second stack of tubing where it remains until again needed.

10 Claims, 13 Drawing Figures

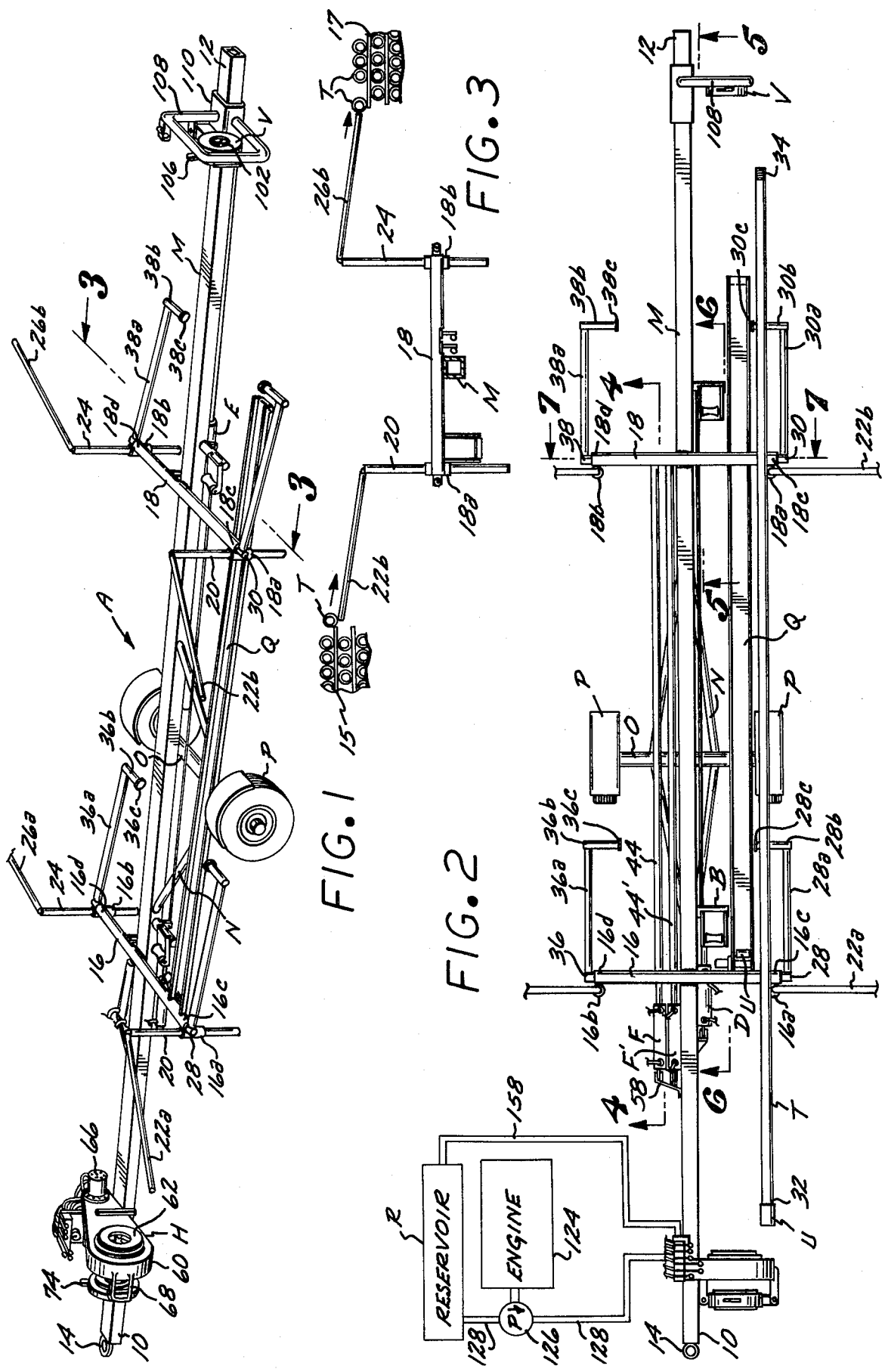

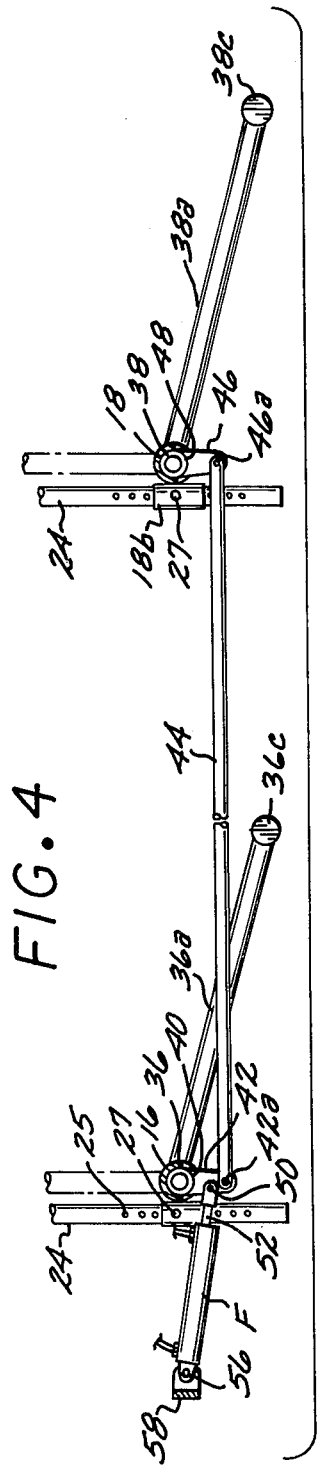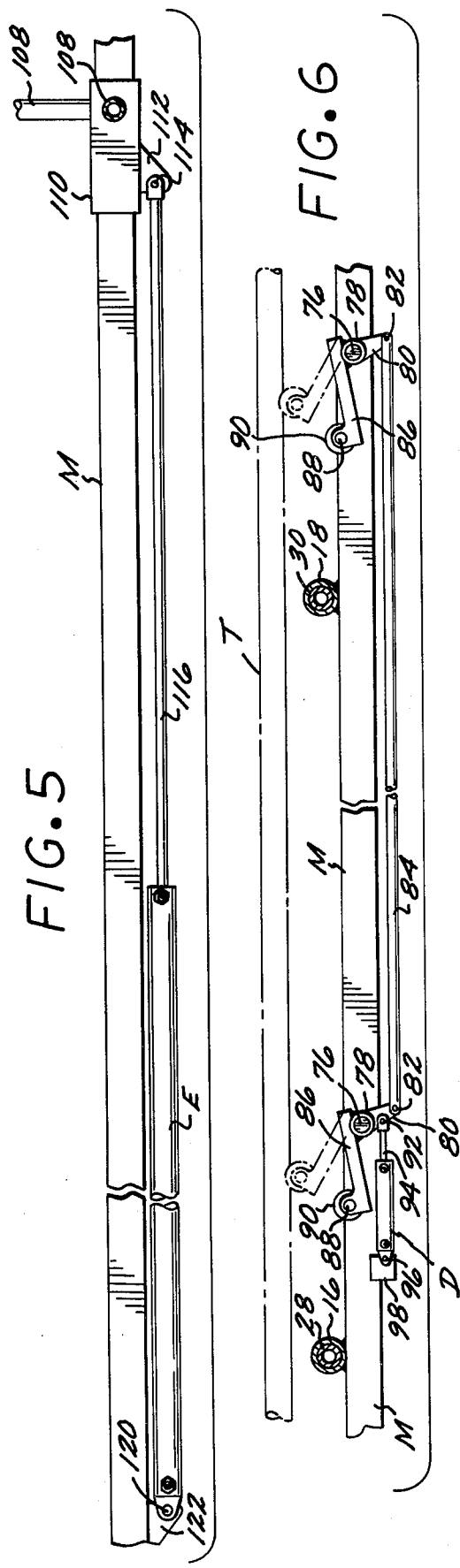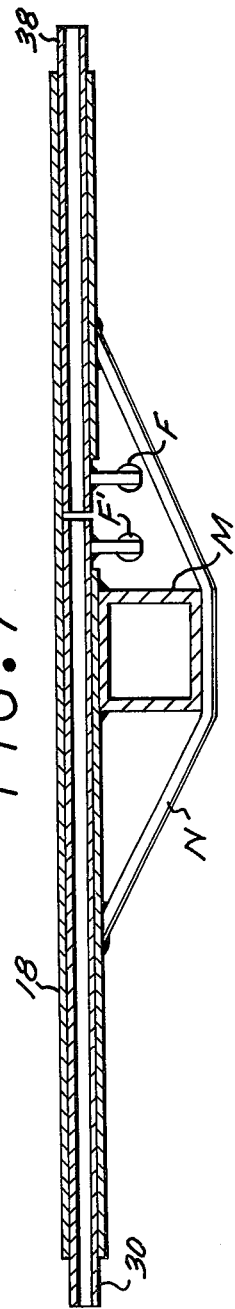

PORTABLE OIL WELL TURBINE COLLAR REMOVING DEVICE

DESCRIPTION OF THE PRIOR ART

In oil field operations it is common practice to stack lengths of oil well tubing removed from a well, which lengths of tubing will have collars mounted on one end thereof. Prior to the tubing again being used, it is desirable that the collars be removed from the lengths of tubing and inspected to determine whether the collars are structurally sound or should be discarded.

Such an operation in the past has been slow and time consuming, as the collars due to deposits of minerals and corrosion are tightly bound to the threaded end of the tubing on which they are mounted.

A major object of the present invention is to supply a portable power operated apparatus that may be positioned adjacent a first stack of lengths of oil well tubing having collars mounted thereon, with the lengths of tubing being sequentially rolled onto the apparatus to have the collars separated therefrom, and the collars if found to be structurally sound screwed onto a second end of the length of tubing in a reversed position, and the lengths of tubing with collars on the second ends then being positioned by the apparatus in a second stack of tubing where it is stored until again needed.

Another object of the invention is to supply a power operated apparatus that is simple and easy to use, may be moved from place to place to facilitate the removal of collars from lengths of tubing in a minimum of time and at a minimum of expense, as well as to permit the inspection of the collars to determine whether they are structurally sound and suitable for further use or should be discarded.

These and other objects and advantages of the invention will become apparent from the following description of the preferred form thereof.

SUMMARY OF THE INVENTION

The present wheel supported, power operated, invention may be pulled along a first stack of oil well tubing that has collars mounted on the length of tubing therein. Each length of tubing has first and second threaded ends, with an internally threaded collar being mounted on a first end of each length.

The power operated invention includes an elongate chassis that has first and second ends, and an engine that drives a hydraulic pump being disposed preferably towards the first end of the chassis. The hydraulic pump discharges fluid under pressure into a first manifold, from which fluid may be directed selectively through a number of valves to selectively operate hydraulically actuated components that from a part of the invention.

Hydraulic fluid after operating the components is returned to a second manifold and then flows therefrom to a reservoir that is connected to the suction side of the hydraulic pump. The chassis pivotally supports a pair of first arms that may be pivotally oriented towards the first stack to sequentially receive a length of tubing therefrom, which length of tubing rolls along the pair of first arms towards the chassis. Hydraulically operated first supports receive each length of tubing rolled thereon from the first pair of arms, and lowers the length of tubing to rest on forward and rearward transverse cross pieces supported from the chassis.

Each length of tubing after being positioned on the pair of cross pieces is rolled transversely towards the center thereof, and after reaching the center is raised by a pair of hydraulically operated, vertically movable, grooved rollers until the length is axially aligned with longitudinal openings in a hydraulic powered rotatable tubing gripping member and a first collar engaging means located on the forward end of the chassis. The tubing gripping member is now caused to rotate the length of tubing, with the first collar engaging means removably gripping a collar to hold it in a stationary position, and the collar having an internally threaded first end portion separated from the length of tubing as a result of the rotation.

The collar after removal is inspected to determine whether it is serviceable, and if so is moved longitudinally to the rearward end of the invention by rolling along an inclined trough, or moving rearwardly by use of an elongate belt.

The collar after reaching the rearward end of the invention is manually disposed in a reversed position in a second hydraulically power operated engaging means that may be moved forward as the length of tubing is rotated on the invention. The second end portion of the collar is now screwed on the second end of the length of tubing.

The collar is now released from the second engaging means, and the second engaging means moved rearwardly out of engagement with the collar. Second hydraulic powered operating means lift the length of tubing upwardly from the pair of rollers to an elevated position where the length of tubing with the collar secured thereto may be rolled outwardly on a second pair of transverse arms to a second stack, or other desired storage facility for the tubing until it is again needed.

BRIEF DESCRIPTION OF THE DRAWINGS

FIG. 1 is a perspective view of the portable hydraulic, power operated, device that may be drawn alongside a first stack of tubing, with lengths of tubing being sequentially removed from the stack and so positioned on the invention that a collar may be removed from a first end of the length of tubing, and the collar if found servicable mounted in a reversed position on a second end of the tubing, and the tubing and collar then being raised and positioned in a second stack;

FIG. 2 is a top plan view of the invention shown in FIG. 1 with a length of tubing having been lowered to rest on a pair of longitudinally spaced transverse cross pieces;

FIG. 3 is a transverse cross sectional view of the invention taken on the line 3-3 of FIG. 1;

FIG. 4 is a longitudinal cross sectional view of the invention shown in FIG. 2 taken on the line 4—4 thereof;

FIG. 5 is a longitudinal cross sectional view of a portion of the invention taken on the line 5—5 of FIG. 2;

FIG. 6 is a longitudinal cross sectional view of a portion of the invention taken on the line 6—6 of FIG. 2;

FIG. 7 is a transverse cross sectional view of the invention taken on the line 7—7 of FIG. 2;

DESCRIPTION OF THE PREFERRED EMBODIMENT

Figure 8:
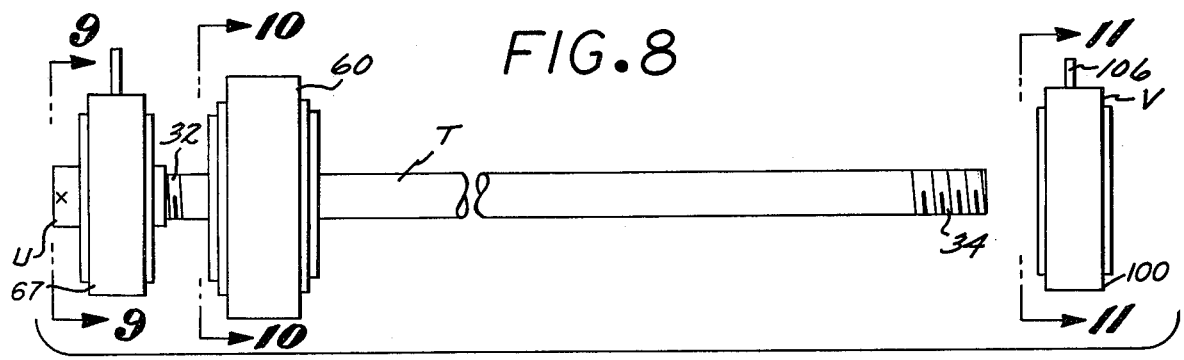
FIG. 8 is a diagrammatic side elevational view of the tubing rotating mechanism in engagement with a portion of the tubing adjacent a first end thereof, with the collar of the first end being removably gripped by a first engaging device, and a second engaging device being shown on the right-hand end of the tubing for removably supporting a collar in a reversed position as it is screwed onto a second end of the tubing.

The portable, power operated, apparatus A of the present invention may be positioned adjacent and parallel to a first stack 15 of oil well tubing T that has collars U mounted on first ends of the lengths of tubing, with the apparatus A sequentially receiving lengths of the tubing T to remove the collars U from first ends thereof, position the collars in a reversed position on the second end of the tubing, and then return the tubing with the collars in the reversed position on the second ends to a second stack 17 of tubing T as shown in FIG. 3.

The portable apparatus A as best seen in FIGS. 1 and 2 includes an elongate chassis M of heavy and durable structure that preferably has a square transverse cross section, with the chassis having a first end 10 and rear end 12. The chassis M is illustrated in FIGS. 1 and 2 as having a hitch 14 mounted on the forward end 10 to permit the apparatus A to be towed from one location to another by conventional means (not shown). The chassis M as shown in FIGS. 1 and 2 has a tubular frame N extending downwardly therefrom that supports a transverse axle O on which a pair of pneumatic tired wheels P are rotatably mounted to permit the apparatus A to be moved from place to place. The chassis M supports longitudinally spaced transverse forward and rearward cross pieces 16 and 18 as may best be seen in FIG. 2.

Two vertically disposed sleeves 16a and 16b are secured to opposite ends of the forward cross piece 16 as shown in FIG. 2. Likewise, two vertically disposed tubular sleeves 18a and 18b are affixed by conventional means to opposite ends of the rearward cross piece 18.

Two elongate vertically disposed members 20 are adjustably supported for vertical movement in the sleeves 16a and 18a, with the members on the upper ends supporting first elongate rigid arms 22a and 22b that slope downwardly and inwardly, when outwardly positioned as shown in FIG. 1. The arms 22a and 22b as shown in FIGS. 1 and 3 when disposed outwardly adjacent a first stack 15 of length of tubing T, permit the lengths of tubing T to be sequentially rolled downwardly thereon towards the chassis M.

Forward and rearward cross pieces 16 and 18 rotatably support first shafts 28 and 30 that project outwardly from first ends 16c and 18c of the cross pieces, as shown in FIG. 2. The first shafts 28 and 30 have elongate rigid members 28a and 30a secured thereto, and these members on the free ends thereof having supports 28b and 30b normally secured thereto, with supports on the inner ends provided with protruding stops 28c and 30c as shown in FIG. 2.

The shafts 28 and 30 by means that will later be explained may be rotated concurrently to move the supports 28b and 30b upwardly adjacent but slightly under the inner ends of the arms 22a and 22b to permit a length of tubing T disposed on the arms to roll downwardly thereon onto the supports 28b and 30b as shown in FIG. 2. The stops 28c and 30c prevent a length of tubing T rolling off the inner ends thereof. When one of the lengths of tubing T is adjacent the stops 28c and 30c, the arms 28a and 30a are pivoted downwardly concurrently by power means later to be described to dispose the length of tubing on the forward and rearward cross pieces 16 and 18 and substantially parallel to chassis M.

After a length of tubing is so disposed, the collar U as will be seen in FIG. 2 is situated adjacent the forward end of the chassis M.

The forward and rearward cross pieces 16 and 18 as may best be seen in FIG. 2 also rotatably supports second shafts 36 and 38 that project outwardly from the ends 16d and 18d thereof, which shafts have second rigid members 36a and 38a normally secured thereto, and the second members on the free ends having second transverse supports 36b and 38b mounted thereon that extend inwardly towards the chassis M, and the supports having stops 36c and 38d on the inner ends thereof.

By rotating the shafts 36 and 38 concurrently by power means later to be described, the second supports 36b and 38b may be moved upwardly to positions where tubing T may be rolled from the second supports onto the arms 26a and 26b to continue rolling and be disposed in the second stack 17 as shown in FIG. 3. The vertical members 24 as shown in FIG. 4 have a number of longitudinally spaced transverse openings 25 formed therein that may be engaged by pins 27 that extends through the sleeves 16b and 18b to maintain the members 24 at a desired elevation. The same type of vertical adjustment is common to the sleeves 16a and 18a that supports the vertical members 20. This adjustment of the members 20 and 24 permits the positioning of the first arms 22a and 22b and second arms 26a and 26b at appropriate positions relative to the stacks 15 and 17 as they increase and decrease in height due to lengths of tubing T being removed therefrom and added thereto.

The forward cross piece 16 as best seen in FIG. 4 has a downwardly disposed cut out portion 40 through which a lever 42 secured to the forward second shaft 36 extends downwardly, with the lower end of the lever 42 being connected by a pin 42a to the forward end of a longitudinal rearwardly extending rod 44. The rod 44 on the rearward end is pivotally connected by a pin 46a to a rearward lever 46 that extends upwardly through an opening 48 in the rearward cross piece 18 and is secured to the second rearward shaft 38.

Figure 13:
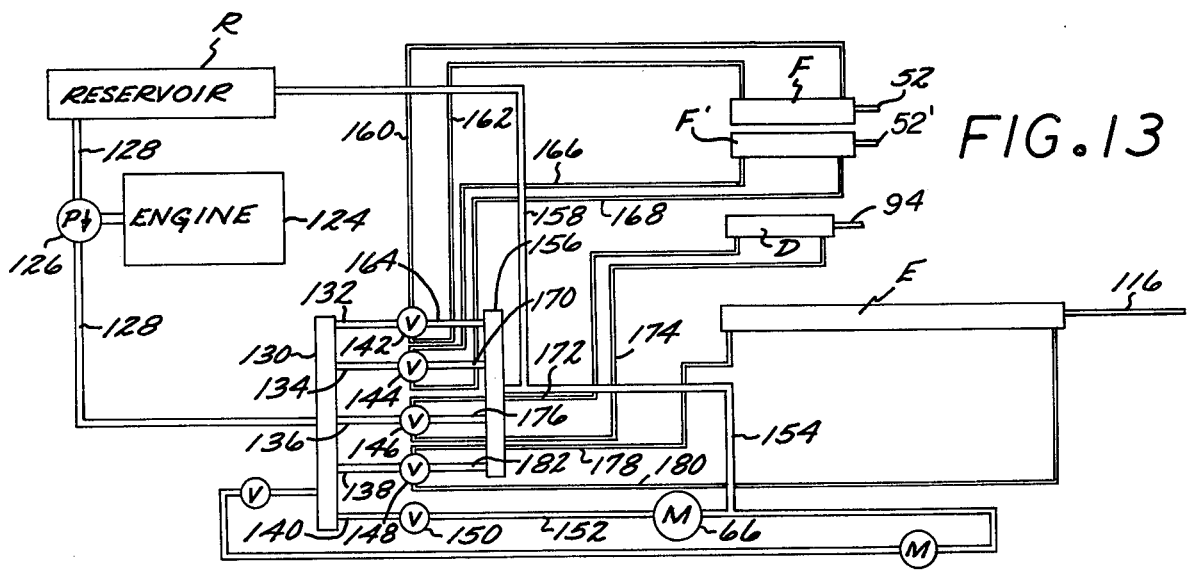
FIG. 13 is a diagrammatic view of the hydraulic system used in actuating the various components of the invention.

A second pin 50 pivotally secures a piston rod 52 to the forward lever 42, with the piston rod 52 being slidably movable in a hydraulic cylinder F as best seen in FIG. 4. Cylinder F on the forward end by a pin 56 is secured to a bracket 58 that is affixed to the chassis member M by conventional means such as welding or the like. Discharge of hydraulic fluid to the hydraulic cylinder F under pressure results in the concurrent pivotal movement of the rigid members 36a and 38a due to rotation of the shafts 36 and 38. The manner in which hydraulic fluid is discharged into and out of the hydraulic cylinder F is shown in detail in FIG. 13 and will later be described. A hydraulic cylinder F' is also pivotally supported from the bracket 58 and has a piston rod 52' associated therewith as shown in FIG. 13. The hydraulic cylinder F' is adjacently disposed to the hydraulic cylinder F, and when cylinder F' is supplied with hydraulic fluid under pressure the piston rod 52' moves and rotates the first and second shafts 28 and 30 in the same manner and with components of substantially the same structure as used in rotating the shafts 36 and 38, and accordingly need not be further described. The manner in which hydraulic fluid is supplied to the hydraulic cylinder F' is illustrated in FIG. 13.

An assembly H is shown in FIG. 1 as mounted on the forward end of the chassis M, with the assembly including a housing 60 that has an opening 62 extending londitudinally therethrough relative to chassis M, which opening has a number of circumferentially spaced radially moved jaws 64 therein. The jaws 64 are rotated by a hydraulic motor 66. The opening 62 is of sufficiently large diameter as to permit one of the collars U and a portion of the length of tubing T on which it is mounted to be moved longitudinally therethrough as shown in FIG. 8. When the radially movable jaws 64 are caused to move inwardly they frictionally grip the forward end of the length of tubing T to rotate the same when motor 66 is actuated.

A collar gripping assembly 67 is by a member 68 secured rotatably in a fixed position relative to the assembly H and forwardly therefrom, with the collar gripping assembly 67 including a transverse opening 70 in which a second set of radially movable jaws 72 are disposed that frictionally grip the collar U when moved inwardly by manipulation of a handle 74.

In FIG. 6 it will be seen that two longitudinally spaced, transverse stub shafts 76 extend outwardly from the chassis member M. Each of the stub shafts 76 rotatably supports a sleeve 78 that has a lug 80 extending downwardly therefrom as viewed in FIG. 6, with the lugs by pins 82 being pivotally connected to an elongate, longitudinally extending, rigid member 84.

Figure 9:
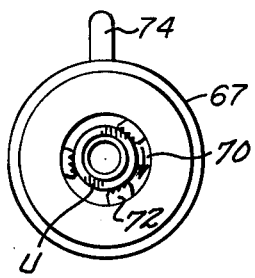
FIG. 9 is a front elevational view of the first collar engaging means taken on the line 9—9 of FIG. 8.
Figure 10:
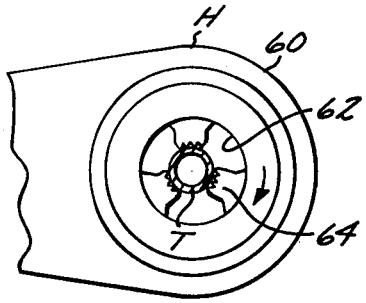
FIG. 10 is a front elevational view of the tubing rotating device taken on the line 10—10 of FIG. 8.

Each of the sleeves 78 on the upper portion thereof as viewed in FIG. 6 has a lever 86 welded or otherwise rigidly secured thereto. The levers 86 extend forwardly as viewed in FIG. 6. The free end of each of the levers rigidly supports a transverse stub shaft 88 that has an elongate concave roller 90 rotatably supported thereon, with the centers of the rollers lying in the same vertical plane as the centers of the openings 62 and 70 as shown in FIGS. 9 and 10. The forwardly disposed lug 80 by a pin 92 is pivotally connected to a piston rod 94 that is slidably movable in a hydraulic cylinder D, which cylinder on the forward end is by a pin 96 pivotally connected to a bracket 98 secured to the chassis member M as shown in FIG. 6.

Figure 11:
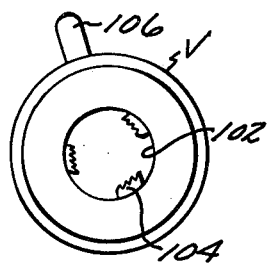
FIG. 11 is a front elevational view of the second collar engaging device taken on the line 11—11 of FIG. 8.
Figure 12:
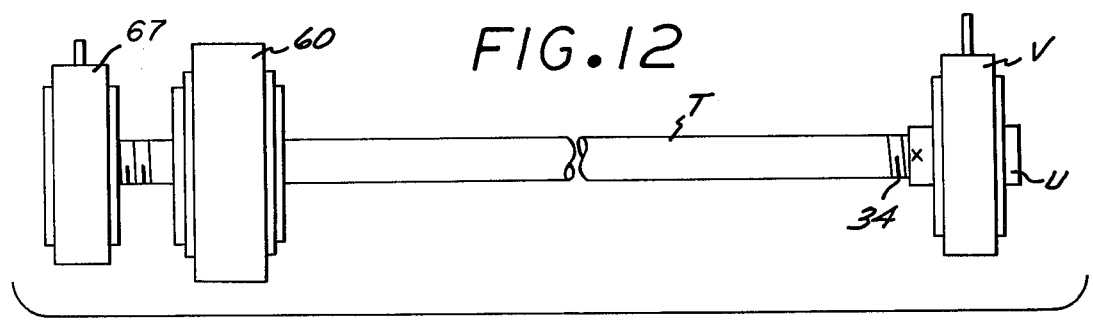
FIG. 12 is the same view as shown in FIG. 8 but with the tubing being rotated relative to a collar held in a reversed position in the second engaging means, and the collar being screwed onto the second end of the tubing as a result thereof.

In FIG. 1 it will be seen that a third assembly V is slidably mounted on the rearward portion of the chassis member M and includes a housing 100 having a centered bore 102 extending therethrough in which a number of radially movably jaws 104 are disposed as shown in FIG. 11. By use of a handle 106 the jaws 104 may be selectively moved inwardly to grip a collar U disposed within the opening 102. The housing 100 is secured to a substantially rectangular support 108 as shown in FIG. 1, which support in turn is mounted on a carriage 110 slidably mounted on chassis M. The carriage 110 as shown in FIG. 5 has a lug 112 extending downwardly therefrom, which lug by a pin 114 is pivotally secured to the rearward end of an elongate piston rod 116 that is slidably movable in an elongate hydraulic cylinder E. The forward end of the hydraulic cylinder E is by a pin 120 pivotally secured to a bracket 122 that is mounted on the other underside of the forward end portion of the chassis member M as viewed in FIG. 5.

In FIGS. 2 and 13 it will be seen that the invention A includes an engine 124 or other prime mover that drives a hydraulic pump 126. A conduit 128 extends from the discharge of pump 126 to a manifold 130 from which first, second, third, fourth and fifth conduits 132, 134, 136, 138 and 140 project. The conduits 132 through 140 inclusive are in communication with first, second, third, fourth and fifth manually operated valves 142, 144, 146, 148 and 150. The discharge from the fifth valve 150 is by a conduit 152 connected to the hydraulic motor 66, which motor has the discharge therefrom in communication with a conduit 154 that extends to a second manifold 156. The conduit 154 is connected to a conduit 158 as shown in FIG. 13 that extends back to the reservoir R. The first valve 142 which is a multi-position valve has conduits 160 and 162 in communication therewith, which conduits extend to opposite ends of the hydraulic cylinder F. As hydraulic fluid is discharged through one of the conduits 160 or 162 to the hydraulic cylinder F, hydraulic fluid is discharged from the other, and flows through the valve and a conduit 164 to the second manifold 156 to be returned to the reservoir R through the conduit 158.

Discharge of fluid to the hydraulic cylinder F results in movement of the piston rod 52 previously identified. Second valve 144 is connected by conduits 166 and 168 to opposite ends of the hydraulic cylinder F', and hydraulic fluid is discharged from the other end back to the second valve 144 and then through a conduit 170 to the second manifold 156 for return to the reservoir R through conduit 158.

The third valve 146 is by conduit 172 and 174 connected to opposite ends of the hydraulic cylinder D, with fluid as it is discharged into one end of the cylinder resulting in fluid being discharged from the opposite end, and this concurrent discharge resulting in longitudinal movement of the piston rod 84. Hydraulic fluid discharged from the hydraulic cylinder D flows to the third valve 146 and then through a conduit 176 to the second manifold 156 to be returned through the conduit 158 to the reservoir R.

The fourth valve 148 has conduits 178 and 180 extending to opposite ends of the hydraulic cylinder E, and as fluid is discharged into one end of the cylinder, hydraulic fluid is discharged from the other to result in longitudinal movement of the piston rod 116. The fifth valve 150 controls the flow of hydraulic fluid under pressure through a conduit 152 to the motor 66, with the hydraulic fluid after flowing through the motor discharging through a conduit 154 and the conduit 158 to the reservoir R.

The manipulation of the valves 142 and 144, 146, 148 and 150 control the operation of the invention A as shown in FIGS. 1 and 2. After a length of tubing has been disposed on the forward and rearward cross pieces 16 and 18 it is rolled thereon to a longitudinally centered position above the rollers 90, with the third valve 146 then being manipulated to energize the hydraulic cylinder D to pivot the levers 86 upwardly from the solid position shown in FIG. 6 to that shown in phantom line in the same figure where the tubing T is axially aligned with the openings 62 and 70 in the housing assembly H and the collar gripping member 67.

The length of tubing T is now slid forwardly on the rollers 90 to position the tubing as shown in FIG. 8, with the length of tubing being frictionally gripped by the jaws 64 and the collar U being gripped by the jaws 72 in the member 67.

The valve 150 is now placed in an open position to cause the motor M to rotate the length of tubing T, and the collar U being unscrewed from the threaded end 32 of the tubing T. The lever 74 is now moved to a position to release the collar U from the jaws 72, with the collar being inspected to determine whether it is serviceable and again may be used. If the collar is found too defective it is of course discarded.

Should the collar be found to be serviceable it is placed in a downwardly and rearwardly extending trough Q that runs the longitudinal length of the chassis M and the collar rolling rearwardly as a result thereof. In lieu of the trough Q a driven endless belt or other means may be provided for transporting an inspected collar U to the rearward end of the assembly A. The inspected collar U to the rearward end of the assembly A. The inspected collar U is now placed in a reverse position in the opening 102 of the assembly V, with the lever 106 being moved to cause the jaws 104 to frictionally engage the collar. The third valve 148 is now moved to a position where fluid discharges to the hydraulic cylinder E to move the piston rod 116 forwardly, with the tubing T being rotated in the same direction as occured when the collar was removed therefrom.

The collar U that is held in a stationary position in the assembly V is now screwed onto the second end 34 of the tubing, but in a reversed position relative to what it occupied when on the first end 32 of the tubing. The fourth valve 148 is now manipulated to move the piston rod 116 rearwardly together with the assembly V after the jaws 104 have been moved outwardly to release the collar U. The third valve 146 is now manipulated to move the piston rod 94, and pivot the levers 86 downwardly for the length of tubing T to rest on the forward and rearward cross pieces 16 and 18. The length of tubing T is now rolled towards the supports 36b and 38b, and these supports in turn being raised to dispose them in alignment with the arms 26a and 26b shown in FIG. 1, where the length of tubing T can be rolled downwardly thereon to be disposed in the stack 17 shown in FIG. 3.

The use and operation of the invention has been described previously in detail and need not be repeated.

What is claimed is:

1. An apparatus that includes an elongate chassis having forward and rearward ends onto which a length of oil well tubing having a collar secured on a first threaded end thereof may be positioned to have said collar removed therefrom, said removed collar transported to said rearward end of said chassis if found suitable for future use, said collar removably gripped on said rearward end and moved forwardly as said length of tubing is rotated to screw said collar on a second threaded end of said tubing, with said length of tubing then removed from said apparatus, said apparatus including:
   a. a pair of longitudinally spaced transverse cross pieces supported on said chassis;
   b. a first pair of transverse arms that extend outwardly from said chassis onto which arms said length of oil well tubing with said collar on said first end may be disposed to be rolled towards said chassis;
   c. first means for receiving said length of tubing with said collar on said first end from said first pair of arms and lowering said length of tubing to rest on said pair of cross pieces where it may be rolled to a centered longitudinally extending position thereon;
   d. second means for raising said length of tubing with said collar on said first end to a predetermined elevation above said chassis, with said collar adjacent said forward end of said chassis;
   e. third means for rotating said length of tubing at said predetermined elevation;
   f. fourth means for removably holding said collar stationary as said length of tubing is rotated at said predetermined elevation to unscrew said collar from said first threaded end;
   g. fifth means for transporting said collar that has been removed from said length of tubing to said rearward end of said chassis;
   h. sixth means for removably holding said collar stationary in a reversed position adjacent said rearward end of said chassis, said sixth means supported on said chassis and longitudinally movable thereon, said collar being screwed onto said second threaded end when said length of tubing is rotated and said sixth means is moved forwardly;
   i. seventh means for raising said length of tubing with said collar on said second threaded end thereof to a first elevated position;
   j. a pair of second transverse arms that extend outwardly from said chassis in a direction opposite to said first pair of arms, said second pair of arms receiving said length of tubing from said seventh means and so supporting said length of tubing with said collar on said second end that said length of tubing may be rolled outwardly on said second pair of arms to a position remote from said apparatus, with said first, second, third and seventh means at least being power operated;
   k. power means for supplying power to said first, second, third and seventh means; and
   l. manually operated control means for independently supplying power from said power means to said first, second, third and seventh means to permit them to operate independently of one another.

2. An apparatus as defined in claim 1, in which said first, second, third and seventh means are hydraulically operated, with said power means being a source of pressurized hydraulic fluid that includes an engine, a hydraulic pump driven by said engine, said pump having a discharge and suction, and a reservoir for hydraulic fluid in communication with said suction, and said manually operated control means being a plurality of conduits and multi-position valves that selectively effect communication between said discharge of said source of pressurized hydraulic fluid and said first, second third and seventh means and said reservoir.

3. An apparatus as defined in claim 2, in which said pair of cross pieces have first and second ends, and said apparatus in addition including:
   m. a first pair of vertically disposed sleeves secured to said first ends of said pair of cross pieces;
   n. a pair of vertical members slidably supported in said first pair of sleeves, said pair of members having upper ends; and o. eighth means for adjustably supporting said members in said sleeves, with said first pair of arms extending outwardly from said upper ends of said members, and said arms when disposed below an upper layer of lengths of tubing with collars on said first ends thereof to be sequentially rolled onto said arms to be disposed on said apparatus.

4. An apparatus as defined in claim 2, in which each of said pair of cross pieces are tubular and have first and second ends and a downwardly extending opening in each of said pair of cross pieces intermediate said first and second ends, and said second means including:

m. a pair of shafts rotatably supported in said pair of tubular cross pieces and extending between said first ends and said openings;

n. a pair of rigid members secured to said pair of shafts adjacent said first ends of said tubular cross pieces, said pair of members having free ends;

o. a pair of supports extending outwardly from said pair of free ends onto which a length of said tubing with a collar on said first end may be rolled;

p. a pair of rigid levers secured to said pair of shafts and extending downwardly through said openings to terminate in free end portions;

q. a longitudinally extending rod pivotally connected to said free end portions of said levers;

r. a hydraulic cylinder pivotally connected to said chassis; and s. a piston rod slidably movable in said hydraulic cylinder, said piston rod including a free end portion pivotally connected to one of said levers, with said hydraulic cylinder having passages in opposite ends thereof that are so connected to a portion of said conduits that when one of said valves is manually manipulated said pressurized fluid is discharged into a desired one of said passages and hydraulic fluid discharging from the other of said passages returns through one of said conduits to said reservoir, with the manual manipulation of one of said valves resulting in a desired upward or downward movement of said pair of supports as said pair of shafts rotate in said pair of cross pieces.

5. An apparatus as defined in claim 2, in which said second means includes:

m. a pair of longitudinally spaced and aligned transverse shafts supported from said chassis;

n. a pair of sleeves rotatably supported on said shafts;

o. a pair of levers having first and second ends, said first ends secured to said sleeves;

p. a pair of transverse concave rollers rotatably supported from said second ends of said levers;

q. a pair of lugs that extend downwardly from said pair of sleeves to terminate in free end portions;

r. an elongate rigid member pivotally connected to said free ends of said lugs;

s. a hydraulic cylinder that has a pair of passages in the ends thereof, said hydraulic cylinder pivotally supported from said chassis; and t. a piston rod slidably mounted in said hydraulic cylinder, said piston rod having a free end pivotally connected to one of said lugs, and said pair of passages so connected to a portion of said conduits that when one of said valves is manually manipulated said pressurized hydraulic fluid is discharged into one of said passage and hydraulic fluid discharging from the other of said passages to return through one of said conduits to said reservoir, with the manual manipulation of one of said valves resulting in the concurrent upward and downward movement of said pair of rollers, with said pair of rollers when said length of tubing with said collar on said first end thereof is longitudinally aligned therewith capable of raising said length of tubing to said predetermined elevation or lowering said length of tubing to rest on said pair of cross pieces.

6. An apparatus as defined in claim 5, in which said third means includes:

u. a transverse housing mounted on said chassis adjacent said forward end thereof, said housing having a ongitudinal opening thereof sufficient size as to permit said collar on said length of tubing resting on said pair of rollers to be moved forwardly therethrough when said length of tubing is at said predetermined elevation for a section of said length of tubing to be disposed within said housing;

v. a plurality of rotatable, circumferentially spaced, radially movable jaws in said housing that have inwardly disposed tubing gripping ends, said jaws when in first positions having said gripping ends extending into said longitudinal opening but spaced sufficiently from one another as to permit said collar on said length of tubing to be moved through said opening to a position forwardly of said housing;

w. a hydraulic motor operatively associated with said jaws for concurrently rotating the same in a first direction to unscrew said length of tubing from said collar when the latter is removably gripped by said fourth means, said hydraulic motor having an inlet and an outlet; and x. eighth means for concurrently moving said jaws inwardly for said gripping ends to frictionally engage said section of tubing and rotate said length of tubing in said first direction when said hydraulic motor is driven by said pressurized hydraulic fluid, with said inlet and outlet so connected to a portion of said conduits that when one of said valves is manually manipulated said pressurized hydraulic fluid is discharged to said inlet and hydraulic fluid is returned to said reservoir from said outlet through another of said conduits.

7. An apparatus as defined in claim 6, in which said fourth means is an assembly supported from said housing forwardly thereof, said assembly including an opening in which said collar on said first end of said length of tubing may be disposed, non-rotatable radially jaw means that may move from first to second positions to frictionally engage said collar and hold it stationary as said length of tubing is rotated relative thereto in said first direction, and means for moving said jaw means between said first and second positions.

8. An apparatus as defined in claim 2, in which said fifth means is a longitudinal structure supported from said chassis that extends from said forward to said rearward end thereof for supporting said collar as the latter moves rearwardly towards said rearward end.

9. An apparatus as defined in claim 2, in which said sixth means is an assembly supported for longtudinal movement on said rearward end of said chassis, said assembly including an opening in which said collar may be disposed in a reversed position relative to the position to that it initially occupied on said first threaded end of said tubing, means for removably supporting said collar in a non-rotatable position in said assembly, and said collar being screwed onto said second threaded end of said length of tubing as the latter is rotated in said first direction and said assembly and collar are moved forwardly relative thereto.

10. An apparatus as defined in claim 2, in which each of said pair of cross pieces are tubular and have first and second ends and a downwardly extending opening in each of said pair of cross pieces intermediate said first and second ends, and said seventh means.

- m. a pair of shafts rotatably supported in said pair of tubular cross pieces and extending between said second ends and said openings;
- n. a pair of rigid members secured to said pair of shafts adjacent said second ends of said tubular cross pieces, said pair of members having free ends;
- o. a pair of supports extending outwardly from said pair of free ends onto which a length of said tubing with a collar on said second end may be rolled;
- p. a pair of rigid levers secured to said pair of shafts and extending downwardly through said openings to terminate in free end portions;
- q. a longitudinally extending rod pivotally connected to said free end portions of said levers;
- r. a hydraulic cylinder pivotally connected to said chassis; and
- s. a piston rod slidably movable in said hydraulic cylinder, said piston rod including a free end portion pivotally connected to one of said levers, with said hydraulic cylinder having passages in opposite ends thereof that are so connected to a portion of said conduits that when one of said valves is manually manipulated said pressurized fluid is discharged into a desired one of said passages and hydraulic fluid discharging from the other of said passages returns through one of said conduits to said reservoir, with the manual manipulation of one of said valves resulting in a desired upward or downward movement of said pair of supports as said pair of shafts rotate in said pair of cross pieces.

* * * * *